Aug. 3, 1965 R. A. FLOWER 3,198,936
SYSTEM FOR DETERMINING MACH NUMBER VELOCITY
Filed June 5, 1962 3 Sheets-Sheet 1

INVENTOR.
ROBERT A. FLOWER

BY *H. S. Mackey*

ATTORNEY.

Aug. 3, 1965   R. A. FLOWER   3,198,936
SYSTEM FOR DETERMINING MACH NUMBER VELOCITY
Filed June 5, 1962                         3 Sheets-Sheet 3

INVENTOR.
ROBERT A. FLOWER
BY
ATTORNEY.

3,198,936
SYSTEM FOR DETERMINING MACH
NUMBER VELOCITY
Robert A. Flower, White Plains, N.Y., assignor to General Precision Inc., a corporation of Delaware
Filed June 5, 1962, Ser. No. 200,180
9 Claims. (Cl. 235—151)

This invention relates to supersonic aircraft and to instruments thereon for determining the Mach number velocity. The invention is especially useful at high altitudes where conventional types of airspeed meters are useless.

At supersonic speeds an aircraft creates ahead of it a cone of disturbed and compressed air. The half angle of this cone, $\theta$, is an angle the sine of which is equal to the velocity of sound in air, $V_s$, divided by the airspeed of the aircraft, $V_a$. The Mach number, M, is defined as the ratio $$M = \frac{V_a}{V_s} \quad (1)$$

so that $$M = \frac{1}{\sin \theta} \quad (2)$$

It is well known that the cone of disturbed air includes a zone of air pressure change which is so abrupt as perhaps to be termed a pressure discontinuity, and that this conical wall or zone is capable of reflecting a small but notable portion of microwave electromagnetic energy which may be radiated toward it. Moreover, at high supersonic speeds the air is ionized to some degree, which increases the microwave reflectivity of the air cone. This property of such an air pressure discontinuity of reflecting microwave radiations forms the basis for the operation of this invention.

If a microwave waveguide of any type be provided at regular intervals along its length with isotropic radiators fed by energy transmitted along the waveguide, it is evident that a cone of energy will be radiated and that the conical half angle, $\theta_r$, will be given by $$\sin \theta_r = \frac{\lambda}{\lambda_g} \quad (3)$$

in which $\lambda$ is the wavelength in free space and $\lambda_g$ is the wavelength in the waveguide.

The cutoff wavelength, $\lambda_c$, in a rectangular or other hollow waveguide, is given by $$\lambda_c = \frac{2}{\sqrt{\left(\frac{m}{a}\right)^2 + \left(\frac{n}{b}\right)^2}} \quad (4)$$

in which $m$ and $n$ are the subscripts of the symbol representing the mode of excitation of the waveguide, and $a$ and $b$ are the larger and smaller cross-sectional dimensions. In the case of rectangular hollow waveguide operated in the dominant $TE_{10}$ mode, $m=1$, $n=0$, and Equation 4 reduces to $$\lambda_c = 2a \quad (5)$$

The wavelength in an air-filled hollow waveguide is related to the free space wavelength, $\lambda$, and the cutoff wavelength, $\lambda_c$, by $$\lambda_g = \frac{\lambda}{\sqrt{1-\left(\frac{\lambda}{\lambda_c}\right)^2}} \quad (6)$$

Substituting (5) in (6), and for wavelength substituting frequency, $f$, and the speed of microwave radiation, $c$, $$\frac{\lambda}{\lambda_g} = \sqrt{1-\left(\frac{c}{2af}\right)^2} \quad (7)$$

From Equations 7 and 3 it is apparent that the half angle of the radiation cone is a function of the microwave frequency.

In carrying out the purposes of this invention, a supersonic aircraft is fitted with a linear microwave array which projects forward from its nose. The array consists of a hollow rectangular waveguide having a series of apertures along one of its broad faces. The combined radiation of these apertures is in the form of a half cone having its apex at the forward end of the waveguide. The forward waveguide end also generates a pressure cone when the aircraft is flying at supersonic speed. When the linear antenna points in a direction which is coincident with the air velocity direction, and when the half angle of the radiation cone exactly equals the half angle of the pressure cone, the two cones are congruent. When this occurs the reflection of microwave radiation from the pressure cone is maximum. Combining Equations 2, 3 and 7, and equating $\theta$ to $\theta_r$, $$M = \frac{1}{\sqrt{1-\left(\frac{c}{2af}\right)^2}} \quad (8)$$

That is, when the two cones are congruent, the Mach number is a function of the microwave frequency and two constants, as shown by Equation 8.

In the instant invention apparatus is employed which measures the frequency corresponding to that causing congruence of the cones, and the Mach number is indicated directly. Other apparatus servos the antenna to coincidence with the pressure cone axis and thus measures the instantaneous yaw angle and angle of attack. Still other apparatus permits setting in air temperature and pressure, then solves Equation 1 for airspeed, $V_a$.

One purpose of this invention is to measure the Mach speed of a supersonic aircraft.

Another purpose of this invention is to measure the airspeed of a supersonic aircraft.

Still another purpose of this invention is to measure the angle of yaw and angle of attack which a supersonic aircraft may have.

A further understanding of this invention may be secured from the detailed description and associated drawings, in which.

Figure 1:
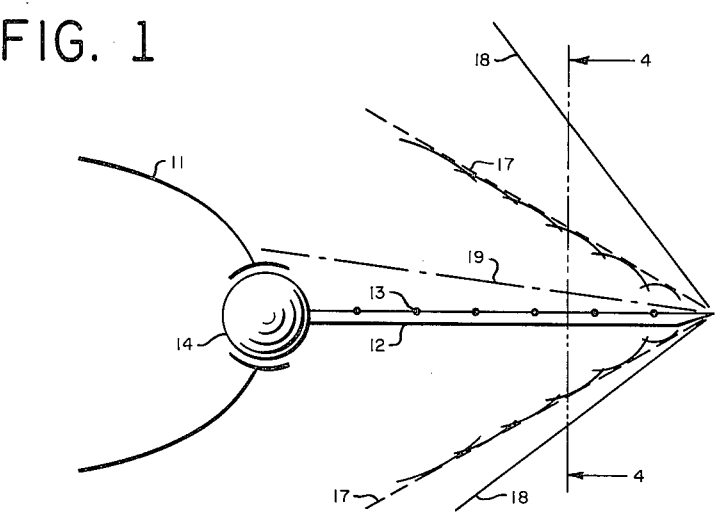
FIGURE 1 is the side view of the nose of a supersonic aircraft containing a probe.

Referring now to FIGURE 1, the nose 11 of a supersonic aircraft is provided with a spar or probe 12 which may be in the form of a rectangular waveguide. This probe is shown aligned with the aircraft fore-aft axis. The waveguide is of the "leaky pipe" type and constitutes a linear array antenna. To this end the waveguide is provided with apertures regularly spaced along one of its broad sides, which is shown positioned uppermost. These apertures are indicated by the dots 13. The probe 12 is supported in a ball-and-socket joint 14 so that it may be rotated through selected angles both in the angle-of-attack plane and in the yaw plane. The dashed lines 17 represent the outline of a full cone of radiation from the antenna radiators 13. Actually, since the radiators lie on a broad face of the waveguide, the metal of the waveguide shields half of the cone and energy is radiated over not more than one-half of the cone at any instant.

The front end of the probe is pointed and, at supersonic speeds, generates a pressure cone of air indicated by the solid lines 18. The axis 19 of this cone of compressed air is necessarily in line with the airspeed vector direction. Although in general under stabilized conditions this direction is also that of the aircraft fore-aft axis, and both the yaw angle and angle of attack are zero, often this is not the case. During maneuvers both of these angles may have large values. Consequently, the axis 19 is shown as not being in coincidence, in the angle-of-attack plane, with the linear antenna array 12.

Figure 2:
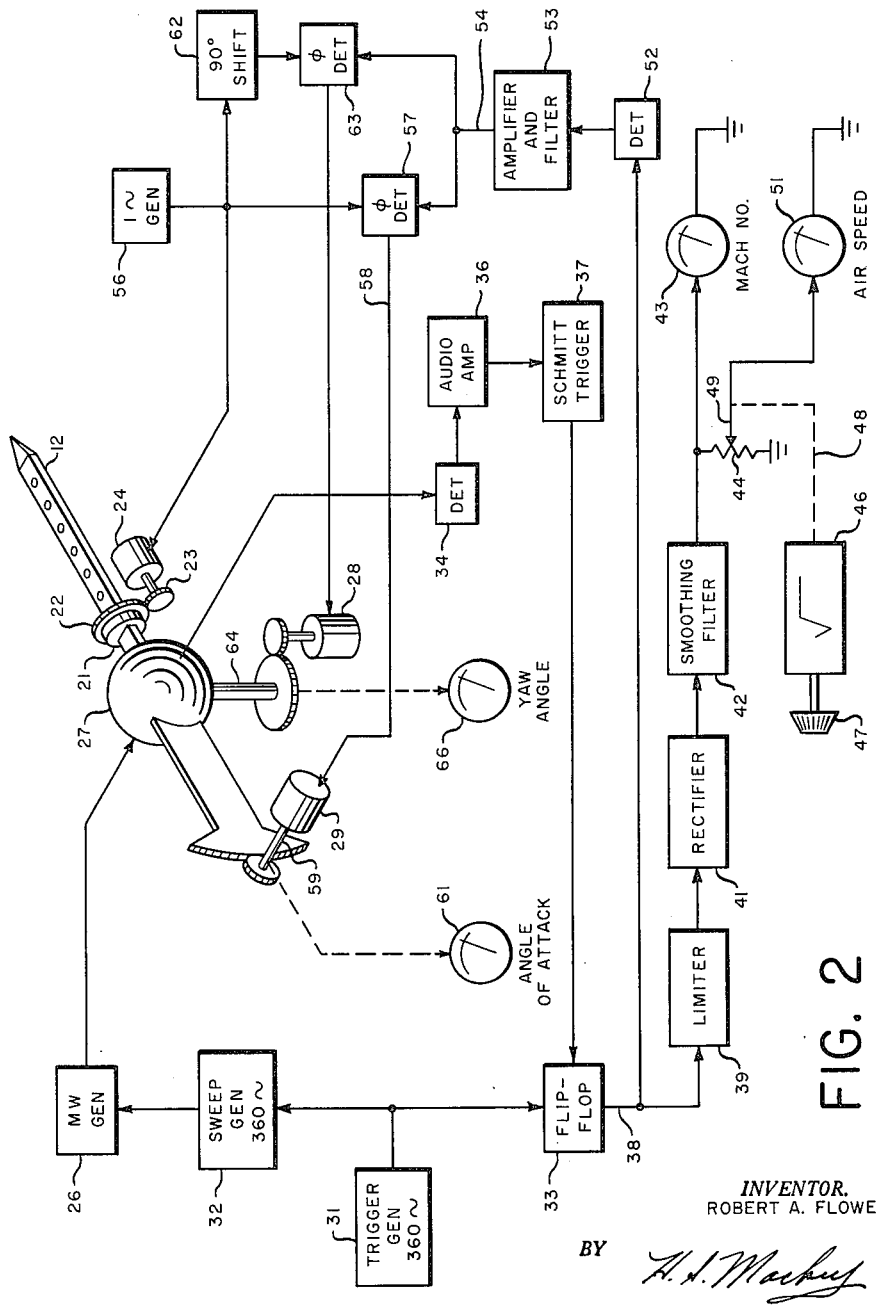
FIGURE 2 is a block diagram of an embodiment of the invention.

The linear antenna array 12 and other components are shown in FIGURE 2. The antenna 12 is provided with a swivel joint 21, which permits the radiating antenna to be rotated, through gears 22 and 23 and motor 24, around its own axis at a rate of one revolution per second. The antenna 12 is fed with microwave energy from a microwave generator 26 through a duplexing circuit 27 contained in the ball of a universal joint. The antenna 12 is rotated in the yaw angle plane, relative to the frame of the aircraft, by a motor 28, and is rotated in the angle-of-attack plane by a motor 29.

Figure 3:
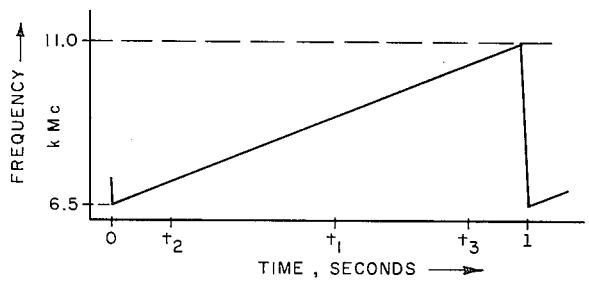
FIGURE 3 is a graph of sawtooth waveform illustrating the mode of transmitter frequency modulation.

A trigger generator 31, operating at a rate of 360 c.p.s., triggers a sawtooth sweep generator 32. This generator 32 is connected to sweep the output frequency of the microwave generator 26 through a selected range; for example, from 6.5 Kmc. to 11.0 Kmc., at a rate of 360 times a second. The sawtooth form of this frequency modulation is shown in FIGURE 3. The trigger generator 31 also is connected to an input of a flip-flop or bistable multivibrator 33.

The receiver output of the duplex circuit 27 is connected to a detector 34. The detector output is in turn amplified in an amplifier 36, then actuates a Schmitt trigger circuit 37. The output pulses of the latter are applied to the flip-flop circuit 33.

The output of the flip-flop 33 imposed on conductor 38 is applied to a current-averaging circuit having as its first component a limiter 39 which limits the top and bottom potentials of the flip-flop square wave output. The limited pulses are then applied to a rectifier 41 followed by a smoothing filter 42. The output, representing M, is applied to a meter 43 which has an inverse scale calibrated in Mach numbers. The output of filter 42 is also applied to a potentiometer 44.

The speed of sound in air $V_s$, is principally dependent upon temperature, so that for the present purpose other factors can be disregarded and the following relation instrumented:

$$V_s = V_0 \sqrt{1 + \frac{T}{273}} \qquad (9)$$

in which $V_0$ is the speed of sound in air at a temperature of zero degrees centigrade and T is the ambient temperature. The instrumentation requires a square root device 46, which may be either of the mechanical devices described in Patent Nos. 2,485,200 and 2,628,024. Temperature is set in manually by the knob 47. This operates gears which generate an angular deflection in shaft 48 representing $V_s$. This shaft 48 positions the slider 49 of potentiometer 44, so that the slider potential is a function of the product of M and $V_s$, and therefore represents the airspeed of the aircraft, $V_a$, in accordance with Equation 1. This quantity is indicated on an airspeed meter 51.

The output conductor 38 from the flip-flop 33 is also connected to a detector 52 followed by a low-pass filter and amplifier 53. These components detect any 1 c.p.s. modulation which the 360 c.p.s. output of the flip-flop 38 may contain, and discriminate against 360 c.p.s., so that the output in conductor 54 contains only a 1 c.p.s. signal.

A 1-c.p.s. generator 56 operates the antenna-rotating motor 24 and also serves as a phase reference. Its output is applied to an angle-of-attack phase detector 57 which also receives the 1 c.p.s. signal from conductor 54. The output in conductor 58 is a direct current signal representing by its sense and amplitude the difference in phase of the inputs. The signal is applied to operate the angle-of-attack motor 29. The motor shaft 59 is provided with an indicating dial 61 which indicates angle of attack.

The output of the reference generator 56 is also phase shifted by 90° in a phase shifting circuit 62 and the output is applied to a phase detector 63 to which is also applied the signal in conductor 54. The phase-detected output is applied to operate the yaw angle motor 28. The shaft 64 operated by this motor is provided with a yaw angle dial 66.

Figure 4:
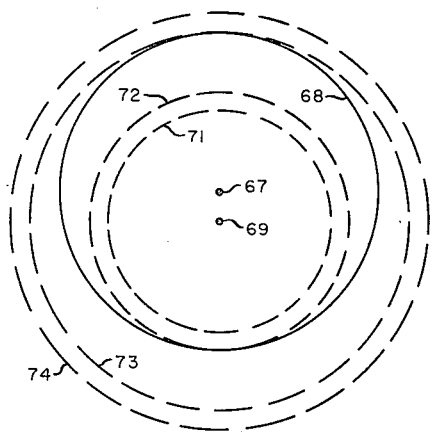
FIGURE 4 is a diagram showing a cross-section of FIGURE 1 taken on the line 4—4.

In the operation of the circuit of FIGURE 2, assume that an angle of attack exists, as shown in FIGURE 1 by the angle between the antenna array 12 and the pressure cone axis 19. The angle of yaw is zero. At a time, $t_1$, during one of the sawtooth scans, as shown in FIGURE 3, the frequency is about 8.5 kmc. and increasing and from Equations 3 and 7 it is apparent that the angle, $\theta_r$, of the radiating cone also is increasing. If a cross-section of FIGURE 1 be taken at any point along the antenna, the conditions will be as indicated in FIGURE 4. The pressure cone axis is indicated by the point 67 and the cross-section of the pressure cone is indicated by the circle 68. The longitudinal axis of the linear antenna is indicated by the point 69. When the frequency is at its lowest limit of 6.5 kmc. the radiation cone angle, $\theta_r$, is smallest; the radiation cone is represented by the circle 71 and does not touch the pressure cone. As the radiation at this frequency travels outward, its cone does intersect the pressure cone, but the intersection is only at a point or over a very small effective area and the amount of energy reflected is trivial. As the frequency and angle $\theta_r$ increase, however, the cross-section of the radiation cone is represented by the dashed circle 72, which coincides in one linear element, at the bottom in FIGURE 4, with the pressure cone 68. When, therefore, the antenna rotation at 1 c.p.s. has brought the linear array semi-cone radiation into this bottom position, and when during several of the 360 c.p.s. frequency scans the expanding radiation cone achieves the position of the lower part of circle 72, an appreciable pulse of signal will be reflected back to the antenna. As the 1-c.p.s. antenna rotation progresses, the radiation circle diameter necessary to touch the pressure cone circle increases to a maximum indicated by the circle 73. At this point the echo signal returned may be slightly stronger because of increased coincidence of the larger diameter circles. Further increases of frequency and angle result in the maximum cross-section circle 74, which does not coincide with the pressure cone circle at any element. Thus the pulse returned during each scan changes in its time during the 1 c.p.s. antenna rotation, changing sinusoidally between times $t_2$ and $t_3$, FIGURE 3.

Figures 5A, 5B:
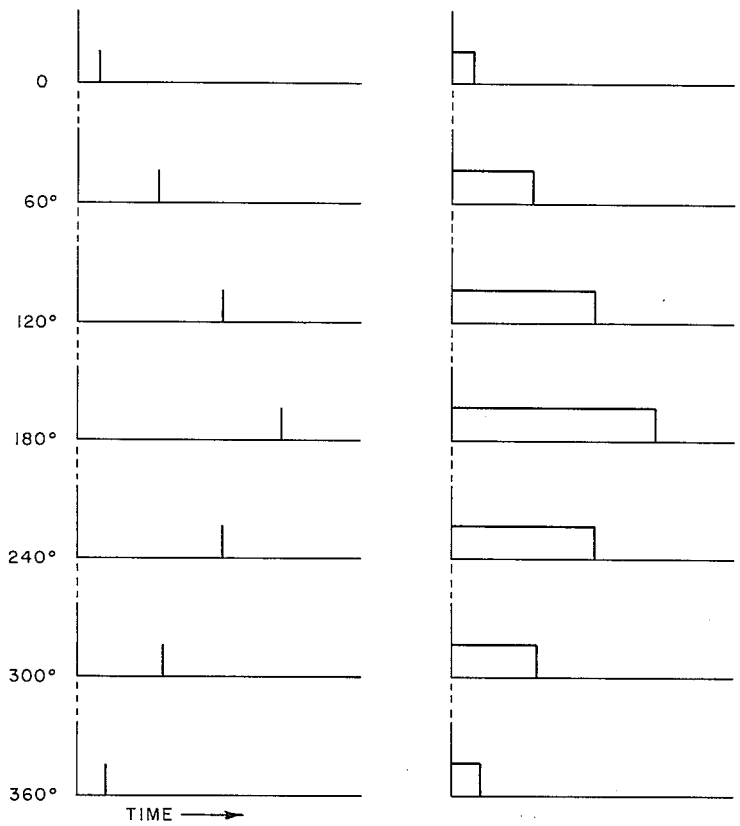
FIGURES 5A and 5B are series of graphs illustrating the operation of the invention.

The received pulses are detected by detector 34, FIGURE 2, and amplified by amplifier 36. They are then applied to trigger a Schmitt circuit 37 emitting pulses of constant amplitude and width, each Schmitt circuit output pulse beginning at the time of its triggering pulse. These Schmitt circuit output pulses are indicated in FIGURE 5A for several of the 360 sweeps occurring during a 1-second antenna rotation. The abscissae of these graphs represent the time, measured from the beginning of the frequency sweep, at which the pulse occurs, this time being within the limits $t_2$ and $t_3$, FIGURE 3.

The flip-flop 33 has two output potential states, zero and +25 volts, at its output conductor 38. Initially, its output potential is zero. At the application of a pulse from the 360 c.p.s. generator 31 its output state is changed to 25 volts. This is returned to zero upon receipt of a pulse from the Schmitt circuit 37. The outputs then, during the 360 scans within one revolution of the antenna, are indicated by the 60° samples shown in FIGURE 5B.

Each of the 360 flip-flop outputs represented by the graphs of FIGURE 5B represents a quantity of electricity, and each quantity represents a distance from the antenna axis 69, FIGURE 4, to the pressure cone circle 68. The average of these distances is approximately equal to the radius of the pressure cone circle 68, which is in turn a measure of the sine of the pressure cone half angle.

Accordingly, the 360 flip-flop outputs are averaged in the averaging circuit including components 39, 41 and 42, FIGURE 2, and indicated by meter 43, the indication of which is thus proportional to the sine of the pressure cone half angle and thus, in accordance with Equation 2, is an inverse function of the Mach number. The averaging meter scale is calibrated in Mach units. The filtered signal, representing the Mach speed, is also applied to the potentiometer 44.

The signal $V_s$ in shaft 48 is applied to the slider 49, so that the output to meter 51 represents $MV_s$, or airspeed, $V_a$, in accordance with Equation 1.

The pulses of varying length shown in FIGURE 5B are applied from conductor 38 to the detector 52, where the 1-c.p.s. modulation of the pulse length is recovered. This 1 c.p.s. signal is amplified and filtered in amplifier 53 and applied to the phase detectors 57 and 63. Since an attack angle was postulated, the phase detector 57 will have an output. This output is applied to motor 29 to rotate the antenna 12 in the angle-of-attack plane in such sense as to reduce the angle of attack to zero, when the angle-of-attack dial 61 will read zero. Since no yaw angle was postulated, the output of the yaw phase detector 63 is zero and the yaw angle dial 66 reads zero. When there is a yaw angle, however, it is corrected by feedback to move the antenna in the yaw plane in a manner similar to that described for the angle-of-attack correction.

What is claimed is:

1. A system for determining the Mach number velocity of a supersonic aircraft comprising,
    means carried by the nose of said aircraft for generating an air pressure cone having a cone angle dependent on the Mach number velocity of the aircraft,
    means carried by said aircraft for radiating microwave signals in a wavefront forming a portion of the surface of a cone and for directing said wavefront toward the interior surface of said air pressure cone and for receiving echo signals reflected by said air pressure cone, the apex of the radiated cone being in substantial coincidence with the apex of said air pressure cone,
    and means operated by said echo signals producing an output representative of the Mach number velocity of said aircraft.

2. A system for determining the Mach number velocity of a supersonic aircraft comprising,
    a probe carried by the nose of said aircraft for generating an air pressure cone having a cone angle dependent on the Mach number velocity of the aircraft,
    microwave means carried by said aircraft for radiating microwave signals in a conical wavefront having a radiated cone angle $\theta_r$ determined by the expression $$\sin \tfrac{1}{2}\theta_r = \sqrt{1 - \left(\frac{c}{2af}\right)^2}$$

in which $f$ is the frequency of the radiated signal and $c$ and $a$ are constants, the apex of said radiated cone being in substantial coincidence with the apex of said air pressure cone,
    means receiving microwave echo signals reflected from the interior surface of said air pressure cone,
    and means operated by said echo signals producing an output representative of the Mach number velocity of said aircraft.

3. A system for determining the Mach number velocity of a supersonic aircraft comprising,
    a probe carried by the nose of said aircraft for generating an air pressure cone having an apex and a Mach cone angle, said cone being generated as a result of the passage of said aircraft through the surrounding air mass, the relation between Mach cone angle, $\theta$, and the Mach number, M, being expressed by $$M = \frac{1}{\sin \tfrac{1}{2}\theta}$$

microwave means carried by said aircraft including a linear array antenna for radiating microwave signals in fractional cone form toward the interior surface of said air pressure cone, said radiated signals having a cone angle, $\theta_r$, the relation of which with respect to the microwave frequency, $f$, is expressed by $$\sin \tfrac{1}{2}\theta_r = \sqrt{1 - \left(\frac{c}{2af}\right)^2}$$

in which $c$ and $a$ are constants, the apex of the radiated cone being in substantial coincidence with the apex of said air pressure cone,
    means varying the radiated frequency $f$ whereby the cone angle $\theta_r$ is varied in direct relation with respect thereto,
    means receiving microwave echo signals reflected from the interior surface of said air pressure cone,
    and means operated by said echo signals producing an output representative of the Mach number velocity of said aircraft.

4. A system for determining the Mach number velocity of a supersonic aircraft comprising,
    a probe carried by the nose of said aircraft for generating an air pressure cone having an apex and a Mach cone angle, said cone being generated as a result of the passage of said aircraft through the surrounding air mass, the relation between Mach cone angle, $\theta$, and the Mach number, M, being expressed by $$M = \frac{1}{\sin \tfrac{1}{2}\theta}$$

microwave means carried by said aircraft including a linear array antenna for radiating microwave signals in fractional cone form toward the interior surface of said air pressure cone, said radiated signals having a cone angle, $\theta_r$, the relation of which with respect to the microwave frequency, $f$, is expressed by $$\sin \tfrac{1}{2}\theta_r = \sqrt{1 - \left(\frac{c}{2af}\right)^2}$$

in which $c$ and $a$ are constants, the apex of the radiated cone being in substantial coincidence with the apex of said air pressure cone,
    means repeatedly varying the microwave frequency through a range thus varying the radiated cone angle through a range including the Mach cone angle whereby at the instant of cone angle equality the Mach cone and the radiated cone are in congruence and a maximum microwave echo signal is returned from the Mach cone of compressed air,
    means receiving said echo signal,
    and means operated by said received echo signals for measuring the microwave frequency and the Mach number at which the maximum signals occur.

5. A system for determining the Mach number velocity of a supersonic aircraft comprising,
    a probe projecting forward from the nose of said aircraft for generating an air pressure cone having an apex and a Mach cone angle, said cone being generated as a result of the passage of said aircraft through the surrounding air mass,
    microwave generating means carried by said aircraft, a microwave linear array energized by said microwave generating means, said microwave linear array being carried by said probe, said array emitting directional signals having a wavefront in the form of a part of a cone having an apex, said directional signals being radiated toward the interior surface of said air pressure cone, the radiated partial cone apex being coincident with the apex of said air pressure cone, sweep generator means repeatedly varying the frequency of said microwave generating means through a range whereby said radiated partial cone apex angle is swept through a range including said Mach cone angle and whereby at the instant of cone angle equality the Mach cone and the radiated partial cone are in substantial surface congruence and a maximum microwave echo signal is returned from the Mach cone of compressed air, means receiving said microwave radiation echo signal and generating an electrical received signal representative thereof, means amplitude demodulating said received signal to secure pulse signals representing, by their times of occurrence, the microwave frequencies at the times of said maximum microwave echoes, means generating pulse width modulated signals from said pulse signals representative thereof, and means operated by said pulse width modulated signals securing an output signal representative of the average value thereof, said output signal representing the value of the aircraft velocity in Mach number.

6. A system for determining the Mach number velocity of a supersonic aircraft comprising, a probe projecting forward from the nose of said aircraft for generating an air pressure cone having an apex and a Mach cone angle, said cone being generated as a result of the passage of said aircraft through the surrounding air mass, a microwave generator, a microwave linear array energized thereby, said array being carried by said probe and including a hollow rectangular waveguide and radiators energized therefrom, said array emitting directional signals having a wavefront forming part of a cone with the apex thereof coincident with said air pressure cone apex, said directional signals being radiated toward the interior surface of said air pressure cone, a sweep generator connected to frequency modulate said microwave generator to vary the frequency thereof periodically whereby the apex angle of the radiated partial cone is varied through the value of the Mach cone apex angle and whereby at the instant of equality of the two apex angles the two cones are in congruence and a maximum microwave echo signal is returned, receiving means receiving said microwave echo signal and deriving a microwave signal therefrom, an amplitude detector deriving from said microwave signal a pulse train at the frequency of said sweep generator, the time delay of each pulse after the start of its associated sweep representing the associated microwave frequency and corresponding radiation cone and Mach cone apex angle, a flip-flop circuit having a signal derived from said sweep generator impressed thereon at the time of initiation of each sweep thereof and additionally having the pulses of said pulse train impressed thereon whereby a train of width modulated pulses is generated, each width modulated pulse starting at the time of sweep initiation and terminating at the time of one of the pulses of said pulse train, a limiter limiting the peak potentials of said train of width modulated pulses, a rectifier rectifying said train of width modulated pulses, a smoothing filter averaging the output of said rectifier to generate a potential representing the inverse of Mach number velocity, and means indicating said potential in terms of Mach number.

7. A system in accordance with claim 6 including, means for generating a signal representing sound velocity in the ambient air mass, multiplying means having said potential representing the inverse of Mach number velocity and said signal representing sound velocity impressed thereon, and an air speed indicator connected to the output of said multiplying means.

8. A system in accordance with claim 6 including, means for rotating said microwave linear array about its own longitudinal axis at a selected speed less than the frequency of said sweep generator, motor means for changing the angle of attack of said linear array, detector means for deriving a signal from the output of said flip-flop circuit which signal has a frequency representative of said selected speed, a phase detector receiving the output of said detector means and referenced to said means for rotating the array for producing an error signal, means applying the error signal from said phase detector to control said motor means, and means operated by said motor means for indicating said angle of attack.

9. A system in accordance with claim 6 including, means for rotating said microwave linear array about its own longitudinal axis at a selected speed less than the frequency of said sweep generator, motor means for changing the angle of yaw of said linear array, a 90° phase shift circuit energized from said means for rotating the array, a phase detector receiving the output of said detector means and referenced to said 90° phase shift circuit, means for applying the error signal from said phase detector to control said motor means, and means operated by said motor means for indicating said angle of yaw.

References Cited by the Examiner

UNITED STATES PATENTS 2,937,808   5/60   Newell _____ 340—1

MALCOLM A. MORRISON, *Primary Examiner.*